(12) United States Patent
Primmer et al.

(10) Patent No.: US 12,381,980 B2
(45) Date of Patent: Aug. 5, 2025

(54) GENERATING ACTION PLANS FOR AGENTS UTILIZING PERCEPTION GAP DATA FROM INTERACTION EVENTS

(71) Applicant: Qualtrics, LLC, Provo, UT (US)

(72) Inventors: Matthew Primmer, Mountlake Terrace, WA (US); Monique Piras, Redmond, WA (US); Manisha Powar, Seattle, WA (US); Varun Nandimandalam, Bellevue, WA (US); Yuchen Zhou, Seattle, WA (US); Srivathsan Varadarajan, Mercer Island, WA (US); Ambarish Sridharanarayanan, Seattle, WA (US); Anderson Quach, Seattle, WA (US); Léonie Brown, Shrewsbury (GB)

(73) Assignee: Qualtrics, LLC, Provo, UT (US)

( * ) Notice: Subject to any disclaimer, the term of this patent is extended or adjusted under 35 U.S.C. 154(b) by 176 days.

(21) Appl. No.: 18/163,770

(22) Filed: Feb. 2, 2023

(65) Prior Publication Data
US 2024/0267465 A1  Aug. 8, 2024

(51) Int. Cl.
*H04M 3/00* (2024.01)
*G06N 20/00* (2019.01)
*H04M 3/51* (2006.01)

(52) U.S. Cl.
CPC .......... *H04M 3/5175* (2013.01); *G06N 20/00* (2019.01); *H04M 2203/401* (2013.01); *H04M 2203/402* (2013.01)

(58) Field of Classification Search
CPC .............................. H04M 3/5175; G06N 20/00
See application file for complete search history.

(56) References Cited

U.S. PATENT DOCUMENTS

| | | | |
|---|---|---|---|
| 2020/0311209 A1* | 10/2020 | Mokashi | G06F 40/30 |
| 2022/0374956 A1* | 11/2022 | Jungmeisteris | G06F 3/0482 |
| 2024/0051582 A1* | 2/2024 | Engstrom | G08G 1/167 |

* cited by examiner

Primary Examiner — Rasha S Al Aubaidi
(74) Attorney, Agent, or Firm — Keller Preece PLLC

(57) ABSTRACT

The present disclosure relates to systems, non-transitory computer-readable media, and methods for determining an existence of a perception gap for an interaction event. In particular, in one or more embodiments, the disclosed systems generate a suggested action and provide the suggested action for display via a graphical user interface of an agent device. In some embodiments, the disclosed systems utilize a machine learning model to generate the suggested action for the agent. Furthermore, in one or more embodiments, the disclosed systems generate an agent performance score reflecting an overall performance of an agent. In some embodiments, the disclosed systems utilize a machine learning model to generate the agent performance score.

20 Claims, 13 Drawing Sheets

Mirrored feedback interactions ⎯552

| Interaction ID | CSAT | Self Vs. Customer Perception ⎯554 | Topics ⎯556 | Handle Time (min) ⎯558 | Actions ⎯560 |
|---|---|---|---|---|---|
| 1234567 | 2 | -3 (Self Rating: 5, Customer: 2, Gap: -3) | robotic | 37.5 | ... |
| 2675663 | 1 | -2 | | 20.8 | ... |
| 3453262 | 4 | -1 | | 18.5 | ... |
| 8367368 | 1 | 0 | unhelpful, dumb | 21.1 | ... |
| 9205682 | 5 | 0 | courteous, helpful | 22.8 | ... |
| 90262910 | 4 | +1 | quick | 18.0 | ... |
| 11562845 | 4 | +1 | cheerful, quick | 15.7 | ... |
| 33819528 | 4 | +1 | cheerful, slow | 20.1 | ... |
| 48104282 | 5 | +4 | quick, helpful | 19.7 | ... |

Manager Command Center

Focus on these agents

| Han S. | APS: 7.25 | Marco S. | APS: 9.93 | Tamara D. | APS: 8.25 |
|---|---|---|---|---|---|
| Tenure: 9 months | | Tenure: 2 years 3 months | | Tenure: 11 months | |
| Improve: 12% drop in APS | | Recognize: 30 days since checkin | | Awareness: Upcoming Checkin | |

| Agent | APS | Coaching Type | Agent Vs. Customer Perception | Top Topics | Action Plan |
|---|---|---|---|---|---|
| Marco S. | 9.93 | Recognize | +1.0 | helpful, kind | In Progress: 55% Solicit Frontline Feedback |
| Tamara D. | 8.25 | Awareness | −1.6 | quick, cheerful | In Progress: 32% Solicit Frontline Feedback |
| Will B. | 9.22 | Reinforce | +3.4 | helpful, organized | In Progress: 40% Solicit Frontline Feedback |
| Han S. | 7.25 | Improve | −2.8 | unhelpful, robotic | Not Started |

*Fig. 9*

GENERATING ACTION PLANS FOR AGENTS UTILIZING PERCEPTION GAP DATA FROM INTERACTION EVENTS

BACKGROUND

Recent years have seen developments in assessment of a customer experience during a interaction event (e.g., a user talking to a company agent). For example, conventional systems can survey a customer following an interaction event to collect data on the customer's perspective of the interaction event. To illustrate, conventional systems can ask a customer to rate the overall experience from the interaction event.

Although conventional systems can collect customer-supplied data, such systems have a number of problems in relation to accuracy, efficiency, and flexibility of operation. For instance, conventional systems inaccurately provide ratings of individual agents. Specifically, while some conventional systems have a method for rating an agent, these systems base the agent rating on customer satisfaction ratings only. Thus, the agent ratings reflect customer perceptions without accounting for other aspects of the agent's handling of interaction events, thereby yielding inaccurate agent ratings. For example, conventional systems lack functionality to gather, compare, analyze, and display perception data of an interaction event from different perspectives other than the customer.

Furthermore, conventional systems often require customer experience program managers to use multiple software tools simultaneously to collect and report information relevant to customer care managers and executives. In this way, conventional systems require customer care managers to navigate several steps (e.g., 3, 4, 5, or more) to collect information relevant for developing action plans or coaching plans for agents. Similarly, conventional systems present managers with challenges when trying to focus on implementing the right coaching plans for the right agents at the right time. Further, conventional systems make it difficult and inefficient for to determine insights across all interaction events.

These along with additional problems and issues exist with regard to conventional customer experience systems.

BRIEF SUMMARY

Embodiments of the present disclosure provide benefits and/or solve one or more of the foregoing or other problems in the art with systems, non-transitory computer-readable media, and methods for generating suggested actions for agents based on determining an existence of a perception gap for an interaction event, and providing the suggested actions for display via a graphical user interface of an agent device. In some embodiments, the disclosed systems determine the existence of the perception gap by comparing user feedback data and agent feedback data that respectively indicate perceptions of the interaction event. The disclosed systems can utilize call data, such as topic keywords from the interaction event, to generate the suggested actions. In some embodiments, the disclosed systems can generate an agent performance score for an agent based on call data from the interaction event and/or multiple other interaction events. The disclosed systems can utilize one or more machine learning models to generate the suggested actions and/or the agent performance score.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 5 illustrates a computing device presenting a graphical user interface for displaying interaction data from multiple interactions in accordance with one or more embodiments.

FIG. 9 illustrates a computing device presenting a graphical user interface for displaying agent performance data for multiple agents in accordance with one or more embodiments.

DETAILED DESCRIPTION

Figure 1:
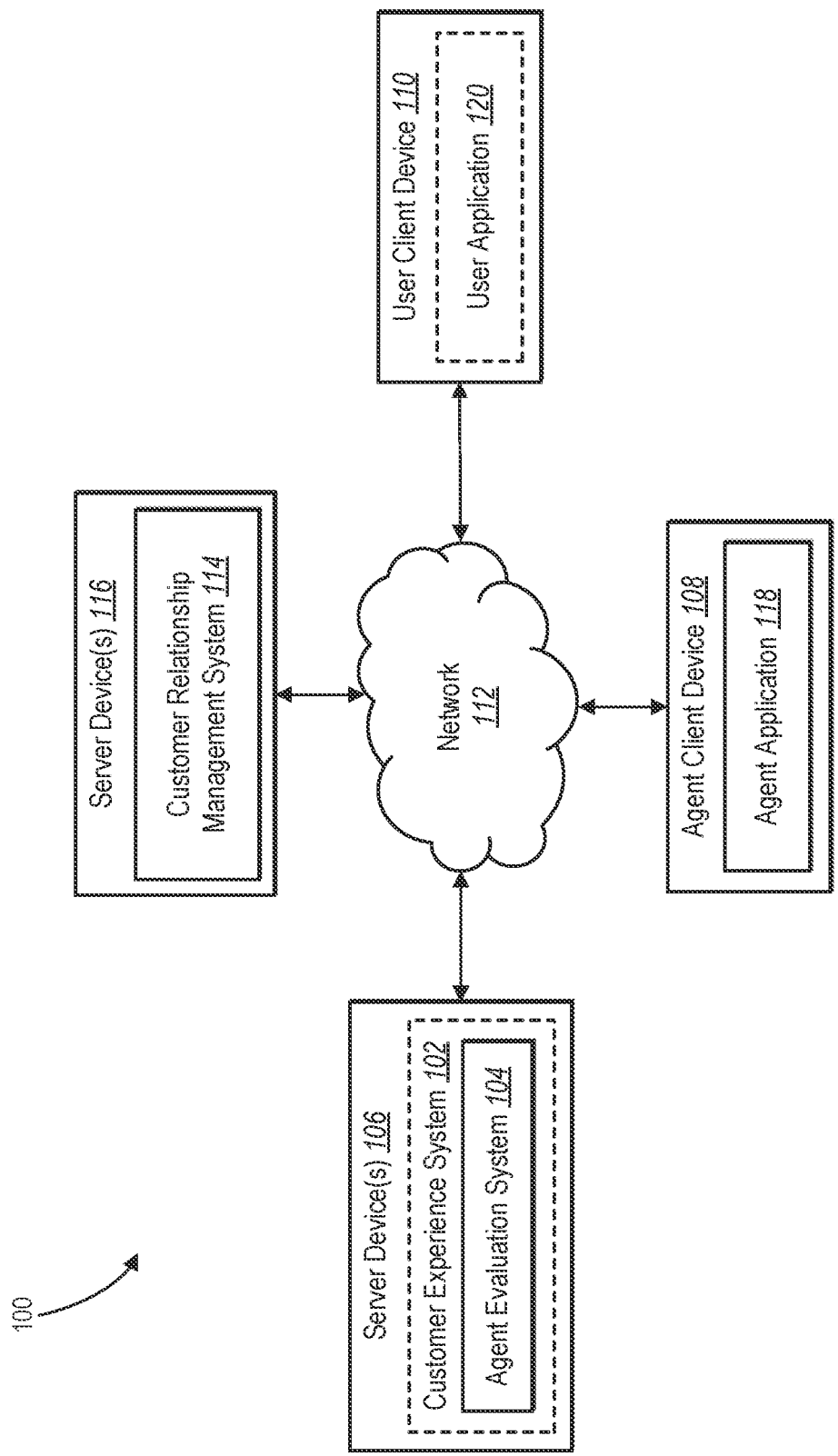
FIG. 1 illustrates a diagram of an environment in which an agent evaluation system can operate in accordance with one or more embodiments.

This disclosure describes one or more embodiments of an agent evaluation system that utilizes agent feedback data to generate a suggested action for an agent and provides the suggested action for display via a graphical user interface of an agent device. In some embodiments, the agent evaluation system utilizes an agent action model to generate the suggested action. Additionally, the agent evaluation system can utilize an agent scoring model to generate an agent performance score.

In some implementations, the agent evaluation system receives user feedback data indicating a user perception of an interaction event. The agent evaluation system also receives agent feedback data indicating an agent perception of the interaction event. The agent evaluation system compares the user feedback data and the agent feedback data to determine an existence of a perception gap between the user perception of the interaction event and the agent perception of the interaction event. Based on determining the existence of a perception gap, the agent evaluation system generates a suggested action for the agent and provides the suggested action for display via a graphical user interface of an agent device associated with the agent.

As mentioned, the agent evaluation system can utilize an agent action model to generate a suggested action for the agent. For example, the agent evaluation system inputs one or more of call data from an interaction event, customer relationship management data (CRM data) from a customer relationship management system, and/or the existence of a perception gap into the agent action model. Upon inputting these pieces of information to the agent action model, the agent evaluation system receives a suggested action. In some embodiments, the agent evaluation system utilizes the agent action model by utilizing a machine learning model to generate the suggested action for the agent. The agent evaluation system provides the suggested action via a graphical user interface of an agent device.

Additionally, or alternatively, the agent evaluation system can utilize an agent scoring model to generate an agent performance score reflecting an overall performance of the agent for multiple interaction events. For example, the agent evaluation system analyzes the user feedback data and the agent feedback data to determine (or adjust) the agent performance score. In some embodiments, the agent evaluation system utilizes a machine learning model to generate the agent performance score. The agent evaluation system can then provide the agent performance score via a graphical user interface of a manager device.

The agent evaluation system can develop a coaching plan for one or more agents, based on CRM data and call data of one or more interaction events involving the one or more agents. For instance, the agent evaluation system evaluates, utilizing a machine learning model, CRM data associated with a particular agent to assess improvement areas for the particular agent. The agent evaluation system provides the coaching plan for display on the graphical user interface of the agent device. As noted, the agent evaluation system can a provide an agent performance score via a graphical user interface of a manager device. Additionally, the agent evaluation system can provide, for display, a progress indicator for a coaching plan of one or more agents via the graphical user interface of the manager device.

The agent evaluation system provides many advantages and benefits over conventional systems and methods. For example, by comparing user feedback data (e.g., customer satisfaction ratings) with agent feedback data (e.g., agent perception ratings), the agent evaluation system improves accuracy of experience data relative to conventional systems. Specifically, the agent evaluation system compares the user feedback data and the agent feedback data to determine an existence of a perception gap between user perception of an interaction event and agent perception of the interaction event. Thus, the agent evaluation system provides more accurate insights into interaction events, leading to more accurate and better tailored action plans and agent performance scores. While conventional systems rate agents based upon customer satisfaction feedback alone, the agent evaluation system includes the existence of the perception gap to provide more meaningful information in the determination of data that indicates an agent performance score.

Additionally, by measuring interaction-by-interaction perspectives of both customers and agents, and by efficiently aggregating customer care interaction data, the agent evaluation system improves the customer experience system relative to conventional systems. For example, the agent evaluation system efficiently gathers, compares, analyzes, and provides for display a perspective by two parties of an interaction-by-interaction experience. Conventional systems are unable to measure, in an efficient manner, such interaction-by-interaction experience perspectives. In this way, the agent evaluation system improves customer experience technology.

Further, the agent evaluation system improves efficiency relative to conventional systems. In particular, the agent evaluation system increases efficiency by which an agent, manager, or executive can navigate through information about agent performance. For example, conventional systems provide information about agent performance in different systems with separate user interfaces, causing an agent or manager to navigate several steps (e.g., 3, 4, 5, or more steps) to access information to help them develop a coaching plan. By contrast, the agent evaluation system brings such information into a single graphical user interface that allows an agent or manager to view the relevant data in one user interface, thereby providing a more efficient interface by reducing the number of steps needed to view agent performance data and develop action plans and coaching plans.

As illustrated by the foregoing discussion, the present disclosure utilizes a variety of terms to describe features and advantages of the agent evaluation system. Additional detail is now provided regarding the meaning of such terms. For example, as used herein, the term "agent" refers to an individual who provides technical support or other assistance to a user (e.g., a customer). In particular, the term "agent" can include a customer service agent. To illustrate, an agent can include a customer help representative who answers customer help requests through a telephone help line, a web-based chat box, a message exchange application, and/or a customer help system.

As used herein, the term "user" refers to an individual who seeks out and/or receives assistance from an agent. In particular, the term "user" can include a customer. To illustrate, a user can be a purchaser, prospective purchaser, past purchaser, subscriber, member, viewer, or client.

As used herein, the term "interaction event" refers to an instance involving two or more people interacting via a communication system (e.g., phone, chat, video, etc.). In particular, the term "interaction event" can include a conversation between an agent and a user for the purpose of receiving assistance. For example, an interaction event can include a telephone call to a customer service line, a videoconference call to a customer service line, and a chat with a customer care agent (e.g., via a chat box, a text message application, a direct message application, or the like).

As used herein, the term "agent feedback data" refers to information provided by an agent during or after an interaction event. In particular, the term "agent feedback data" can include an agent's perception of the interaction event and/or the agent's perception of how the user perceived the interaction event. To illustrate, agent feedback data can include an agent's rating on a predetermined numerical scale of the success of the interaction event. As another example, agent feedback data can include open-ended answers to post-interaction survey questions and/or topic keywords associated with the interaction event.

As used herein, the term "agent perception" refers to an agent's view of the success of an interaction event. In particular, the term "agent perception" refers to the agent's thoughts on whether the user is satisfied with the outcome of the interaction event. For example, agent perception includes the agent's view of whether the user had a positive or negative (or neutral) experience during the interaction event.

As used herein, the term "agent survey" refers to one or more questions presented to the agent during or after the interaction event. Specifically, the term "agent survey" refers to a solicitation by the agent evaluation system for agent feedback data in relation to the interaction event. To illustrate, an agent survey can ask an agent for a rating of the interaction event, an estimation of the user's potential rating of the interaction event, and other questions eliciting agent feedback.

As used herein, the term "user feedback data" refers to information provided by a user during or after an interaction event. In particular, the term "user feedback data" can include a user's perception of the interaction event. To illustrate, user feedback data can include a user's rating on a predetermined numerical scale of the success of the interaction event. As another example, agent feedback data can include open-ended answers to post-interaction survey questions and/or topic keywords associated with the interaction event.

As used herein, the term "user perception" refers to a user's view of the success of an interaction event. In particular, the term "user perception" refers to the user's thoughts on whether the outcome of the interaction event is satisfactory to the user. For example, user perception includes whether the user had a positive or negative (or neutral) experience during the interaction event.

As used herein, the term "perception gap" refers to differences between the agent perception of an interaction event and the user perception of the interaction event. For instance, a perception gap can include a numerical difference between the user perception (e.g., a customer satisfaction rating on a numerical scale) and an agent perception (e.g., an agent rating on the numerical scale).

As used herein, the term "perception gap data" refers to information relating to one or more existences of a perception gap. In particular, the term "perception gap data" can include aggregate information associated with an agent collected over multiple interaction events. To illustrate, perception gap data can include interaction event identification numbers and their corresponding perception gap metrics and trends in perception gap metrics over time.

As used herein, the term "suggested action" refers to a proposed course of action for an agent following an interaction event. In particular, the term "suggested action" can refer to a suggestion to the agent in response to a determination that a perception gap exists from an interaction event. For example, suggested actions can include focus areas, proposed tasks, additional training, reminders, and goal setting.

As used herein, the term "live call data" (or simply "call data") refers to data associated with an interaction event, such as a telephone or videoconference call. For instance, "live call data" can include information disclosed during a call, information about parties to the call, and/or information about the call (e.g., date and time of the call, call duration, etc.). Specifically, call data can include a textual transcription of a conversation from the call, chat or SMS messages associated with the call, and/or survey answers by a customer or an agent who participated in the call.

As used herein, the term "topic keyword" refers to words or terms generally identifying the purpose of an interaction event, decisions or actions taken during an interaction event, or the outcome of an interaction event. In particular, the term "topic keyword" can include spoken words from a conversation (e.g., that the agent evaluation system transcribes during or after the interaction event). Additionally, or alternatively, topic keywords can be written words (e.g., typed or selected from a prompt) input by the agent or the user during or after the interaction event.

As used herein, the term "topic areas" refers to words or terms generally identifying areas for an agent to focus on during a suggested action or a coaching plan. In particular, the term "topic areas" can refer to areas of potential improvement by the agent. To illustrate, topic areas can include topic keywords that reflect focus points for the agent.

As used herein, the term "agent performance score" refers to a metric assessing an agent's overall performance. In particular, the term "agent performance score" can refer to a measure of how the agent's performance compares to a benchmark of a group of agents. For example, an agent performance score can be a numerical value on predetermined scale that reflects the general success of an agent at providing customer care.

As used herein, the term "customer relationship management system" (or "CRM system") refers to a system for managing customer interaction events. For example, the term "CRM system" can include a system for facilitating customer care interactions. Specifically, a CRM system can be a call center system, a help desk system, a customer-agent chat system, and the like.

As used herein, the term "customer relationship management data" (or "CRM data") refers to an aggregation of data associated with multiple agents collected over multiple interaction events, including operational data. For example, "CRM data" can include metrics from interaction events provided by agents and/or customers during the interaction events, as well as raw data about those interaction events. To illustrate, CRM data can include agent feedback data, user feedback data, perception gap data, interaction timestamps, average interaction times (e.g., durations), topic keywords, customer satisfaction ratings, agent performance scores, suggested actions for agents stemming from interaction events, coaching plans for agents stemming from interaction events, self-evaluations by agents, and team objectives, among other metrics.

As used herein, the term "coaching plan" refers to a strategy for improving an agent's skill at customer care. In particular, the term "coaching plan" can refer to a collection of suggested actions for the agent and/or a suggested actions for a manager of the agent.

As used herein, the term "self-evaluation" refers to an agent's submission to the agent evaluation system of a self-coaching plan or of feedback regarding an interaction event. For example, a self-evaluation can include a proactive assertion by an agent that an interaction event should not be considered by the agent evaluation system in determining an agent performance score. As another example, a self-evaluation can include a proactive plan by an agent to undertake an action or a coaching plan (e.g., self-coaching).

Turning now to the figures, FIG. 1 illustrates a block diagram of a system environment 100 in which a customer experience system 102 and an agent evaluation system 104 operate in accordance with one or more embodiments. As illustrated in FIG. 1, the system environment 100 includes server device(s) 106, an agent client device 108, a user client device 110, and server device(s) 116, where the server device(s) 106 include the agent evaluation system 104, and where the server device(s) 116 include a customer relationship management system 114. As shown in FIG. 1, in some embodiments, the customer experience system 102 comprises the agent evaluation system 104. In some embodiments, the agent evaluation system 104 is a standalone system on the server device(s) 106, without the customer experience system 102. Each of the agent client device 108 and the user client device 110 are associated with a type of user. The agent client device 108 may be associated with a customer service representative or customer service agent ("agent") that uses the agent client device 108 to assist customers with help requests or service calls. The user client device 110 may be associated with a customer or other user that uses the user client device 110 to place a service call or submit a help request.

In some embodiments, the agent client device 108 and the user client device 110 communicate with server device(s) 106 and/or server device(s) 116 over a network 112. As described below, the server device(s) 106 and the server device(s) 116 can enable the various functions, features, processes, methods, and systems described herein using, for example, the agent evaluation system 104 and/or the customer relationship management system 114. The agent evaluation system 104 and/or the customer relationship management system 114 comprise computer executable instructions that, when executed by a processor of the server device(s) 106 or the server device(s) 116, perform certain actions described below with reference to FIGS. 2-11. Additionally, or alternatively, in some embodiments, the server device(s) 106 and the server device(s) 116 coordinate with one or both of the agent client device 108 and the user client device 110 to perform or provide the various functions, features, processes, methods, and systems described in more detail below. Although FIG. 1 illustrates a particular arrangement of the server device(s) 106, the server device(s) 116, the agent client device 108, the user client device 110, and the network 112, various additional arrangements are possible. For example, the server device(s) 106 and the customer experience system 102 may directly communicate with the agent client device 108, bypassing the network 112. As another example, the agent evaluation system 104 and the customer relationship management system 114 may be collocated on the server device(s) 106, with or without the customer experience system 102.

Generally, the agent client device 108 and the user client device 110 may be any one or more of various types of client devices. For example, the agent client device 108 and the user client device 110 may be mobile devices (e.g., a smart phone, a tablet), laptops, desktops, or any other type of computing devices, such as those described below with reference to FIG. 12. In some embodiments, the user client device 110 is a telephone. Additionally, the server device(s) 106 and/or the server device(s) 116 may include one or more computing devices, including those explained below with reference to FIG. 12. The server device(s) 106, the server device(s) 116, the agent client device 108, and the user client device 110 may communicate using any communication platforms and technologies suitable for transporting data and/or communication signals, including the examples described below with reference to FIG. 13.

To access the functionalities of the agent evaluation system 104, in certain embodiments, an agent interacts with an agent application 118 on the agent client device 108. Similarly, in some implementations, customers or other users interact with a user application 120. In some embodiments, one or both of the agent application 118 and the user application 120 comprise web browsers, applets, or other software applications (e.g., native applications or web applications) available to the agent client device 108 or the user client device 110, respectively. Additionally, in some instances, the customer experience system 102 and/or the agent evaluation system 104 provides data packets including instructions that, when executed by the agent client device 108 or the user client device 110, create or otherwise integrate the agent application 118 or the user application 120 within an application or webpage for the agent client device 108 or the user client device 110, respectively. For example, in response to an open-ended question provided by the agent client device 108, the user can use the user application 120 to provide a free-form, textual response to the open-ended question. The user client device 110 can then send the response provided by the user back to the agent client device 108 (e.g., via the customer experience system 102). In some embodiments, the user client device 110 communicates with the agent client device 108 without the user application 120, such as through a telephone call.

As an initial overview, the server device(s) 106 provide the agent client device 108 access to the customer experience system 102 and the agent evaluation system 104 by way of the network 112. In one or more embodiments, by accessing the customer experience system 102, the server device(s) 106 provide one or more digital documents or digital interfaces to the agent client device 108 to enable the agent to access (e.g., read, write, edit) call data. In one or more embodiments, by accessing the customer relationship management system 114, the server device(s) 116 provide one or more digital documents or digital interfaces to the agent client device 108 to enable the agent to access (e.g., read, write, edit) customer relationship management data ("CRM data"). For example, the customer experience system 102 can include a website (e.g., one or more webpages) or utilize the agent application 118 to enable the agent to create and/or edit digital content for providing customer assistance and/or for tracking and evaluating agent performance.

In some cases, the agent client device 108 launches the agent application 118 to facilitate interacting with the customer experience system 102, the agent evaluation system 104, and/or the customer relationship management system 114. The agent application 118 may coordinate communications between the agent client device 108 and the server device(s) 106 and/or the server device(s) 116. For instance, the agent application 118 can render graphical user interfaces of the agent evaluation system 104 on the agent client device 108, receive indications of interactions from the agent with the agent client device 108, and cause the agent client device 108 to communicate agent input based on the detected interactions to the agent evaluation system 104.

Figure 2:
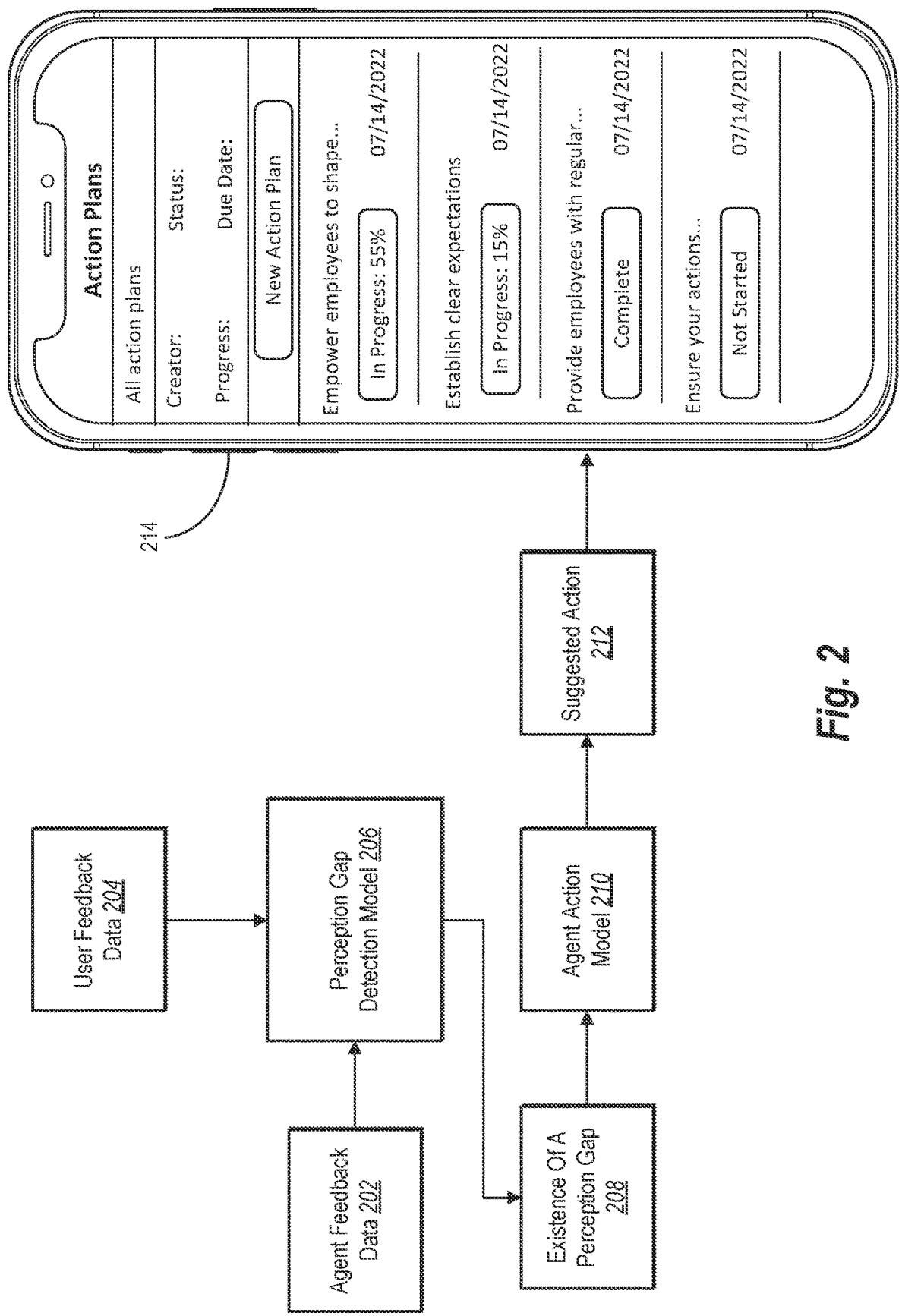
FIG. 2 illustrates an overview of the agent evaluation system analyzing agent feedback data and user feedback data to generate and provide a suggested action in accordance with one or more embodiments.

As discussed above, the agent evaluation system 104 can generate a suggested action for an agent and provide the suggested action for display via a graphical user interface of an agent device associated with the agent. For instance, FIG. 2 illustrates a block diagram of the agent evaluation system 104 in accordance with one or more embodiments. Specifically, FIG. 2 shows the agent evaluation system 104 utilizing a perception gap detection model 206 to determine the existence of a perception gap 208. Further, FIG. 2 shows the agent evaluation system 104 utilizing an agent action model 210 to generate a suggested action 212. Additionally, FIG. 2 illustrates the agent evaluation system 104 providing the suggested action for display via a graphical user interface 214 of the agent device.

To determine the existence of the perception gap 208, the agent evaluation system 104 utilizes the perception gap detection model 206. For example, the agent evaluation system 104 receives agent feedback data 202 and user feedback data 204 for inputs to the perception gap detection model 206. The agent feedback data 202 indicates an agent perception of an interaction event between the agent and a user (e.g., a customer). In some embodiments, the agent feedback data 202 includes the agent's rating of the interaction event, such as a numerical value selected by the agent within a predetermined rating range. In some embodiments, the agent feedback data 202 includes the agent's qualitative assessment of the interaction event.

As mentioned, in some embodiments, the agent evaluation system also receives user feedback data 204. Similar to the agent feedback data 202, the user feedback data 204 can include a user's rating of the interaction event, such as a numerical value selected by the user within the predetermined rating range. In some embodiments, the user feedback data 204 includes a qualitative assessment by the user of the interaction event.

The agent evaluation system 104 utilizes the perception gap detection model 206 to determine an existence of a perception gap 208. For example, in the case of numerical ratings selected by the user and the agent, the agent evaluation system 104 compares the user feedback data 204 with the agent feedback data 202 by subtracting the agent's rating from the user's rating of the interaction event. As another example, the agent evaluation system 104 utilizes the perception gap detection model 206 as a machine learning model that is trained to evaluate and compare qualitative features of a customer care interaction event, such as qualitative responses to survey questions.

For example, the agent evaluation system 104 can utilize a variety of computer-implemented algorithms for the perception gap detection model 206. For instance, in some implementations, the agent evaluation system 104 utilizes a machine learning model, such as a trained neural network or a decision tree machine learning model. For example, the agent evaluation system 104 can train a machine learning model to generate predictions of perception gaps for an interaction event based on a variety of input features, such as topic keywords, user rankings, agent rankings, spoken comments during the interaction event, and/or the time duration of the interaction event.

To illustrate, the agent evaluation system 104 can encode these input features (e.g., utilizing one hot encoding or an embedding network). The agent evaluation system 104 can utilize layers having learned parameters to process the encoded features. At each layer, the neural network can generate intermediate latent feature vectors representing weighted features according to the learned parameters of the network. Utilizing a variety of activation, pooling, convolution layers, normalization, and/or dropout layers, the neural network can generate a prediction (e.g., an existence of a perception gap).

Figure 3:
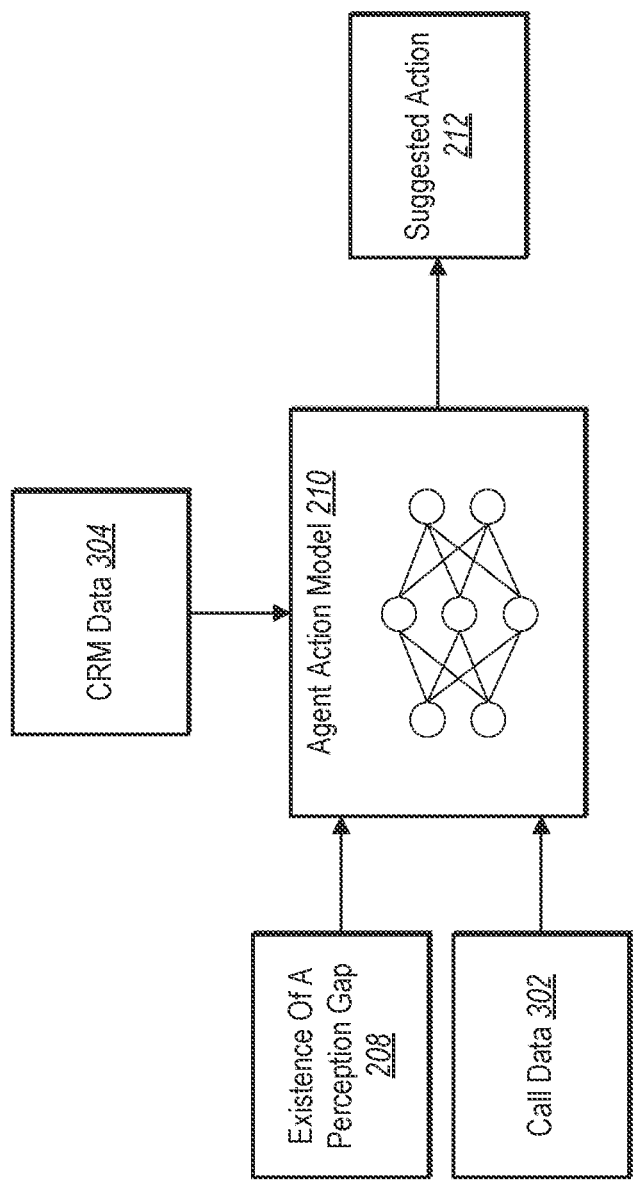
FIG. 3 illustrates a schematic diagram of the agent evaluation system utilizing an agent action model in accordance with one or more embodiments.

Upon determining the existence of the perception gap 208, the agent evaluation system 104 can utilize the agent action model 210 to generate a suggested action 212 for the agent, as described in further detail below in connection with FIG. 3. For instance, the agent evaluation system 104 utilizes the agent action model 210 to determine that the agent could reduce future perception gaps by verifying with the user that the agent has fully resolved the user's concern(s) or issue(s).

As mentioned, in some embodiments, the agent evaluation system 104 provides the suggested action 212 for display via a graphical user interface 214 of the agent device associated with the agent. For example, the agent evaluation system 104 provides the suggested action in a list of one or more suggested actions via a user interface of a mobile device used by the agent.

As discussed above, the agent evaluation system 104 can utilize the agent action model 210 to generate a suggested action 212 for the agent. For instance, FIG. 3 illustrates the agent evaluation system 104 generating a suggested action 212 in accordance with one or more embodiments. Specifically, FIG. 3 illustrates the agent evaluation system 104 giving inputs to the agent action model 210 of the existence of a perception gap 208, call data 302 from the interaction event, and CRM data 304 pertaining to one or more agents.

The agent evaluation system 104 can utilize a variety of computer-implemented algorithms for the agent action model 210. For example, in some implementations, the agent evaluation system 104 utilizes a machine learning model, such as a trained neural network or a decision tree machine learning model. For instance, the agent evaluation system 104 can train a machine learning model to generate a suggested action for the agent based on one or more of the existence of the perception gap 208, the call data 302 from the interaction event, and the CRM data 304 pertaining to one or more agents.

To illustrate, the agent evaluation system 104 can encode these input features (e.g., utilizing one hot encoding or an embedding network). The agent evaluation system 104 can utilize layers having learned parameters to process the encoded features. At each layer, the neural network can generate intermediate latent feature vectors representing weighted features according to the learned parameters of the network. Utilizing a variety of activation, pooling, convolution layers, normalization, and/or dropout layers, the neural network can generate a prediction (e.g., an appropriate action, action plan, or coaching plan to suggest for the agent).

During training, the agent evaluation system 104 can learn parameters of the machine learning model. For example, the agent evaluation system 104 can compare predictions (e.g., suggested actions) generated by a neural network with ground truth predictions (e.g., ground truth suggested actions). In some implementations, the agent evaluation system 104 utilizes a loss function to determine a measure of loss between the prediction and the ground truth. The agent evaluation system 104 can then modify parameters of the neural network utilizing the measure of loss. For example, the agent evaluation system 104 can utilize gradient descent and backpropagation to modify parameters of the neural network to reduce the measure of loss. The agent evaluation system 104 can iteratively modify parameters utilizing training predictions and ground truths to train the neural network.

In addition to machine learning models, the agent evaluation system 104 can also utilize other models to determine a suggested action, action plan, or coaching plan. For example, the agent evaluation system 104 can utilize heuristic models informed by historical features. To illustrate, in some implementations, the agent evaluation system 104 utilizes heuristic models that consider a variety of different features informed by historical data to generate the suggested action. For instance, the agent evaluation system 104 can measure CRM data 304 for one or more agents, historical suggested actions for the one or more agents, and changes to agent metrics such as the agent performance scores for the one or more agents following receipt of the suggested actions. The agent evaluation system 104 can then utilize a historical suggested action as a predicted suggested action in circumstances that align with the measured features. Thus, based on historical data, the agent evaluation system 104 can develop a heuristic model that generates predicted suggested actions based on contextual features.

As mentioned, the agent evaluation system 104 can utilize the agent action model 210 to compare or contrast the existence of the perception gap 208 and/or the call data 302 with the CRM data 304 to generate the suggested action 212. For example, the agent evaluation system 104 utilizes the agent action model 210 in the form of the machine learning models described above to determine a predicted suggested action.

Figure 4:
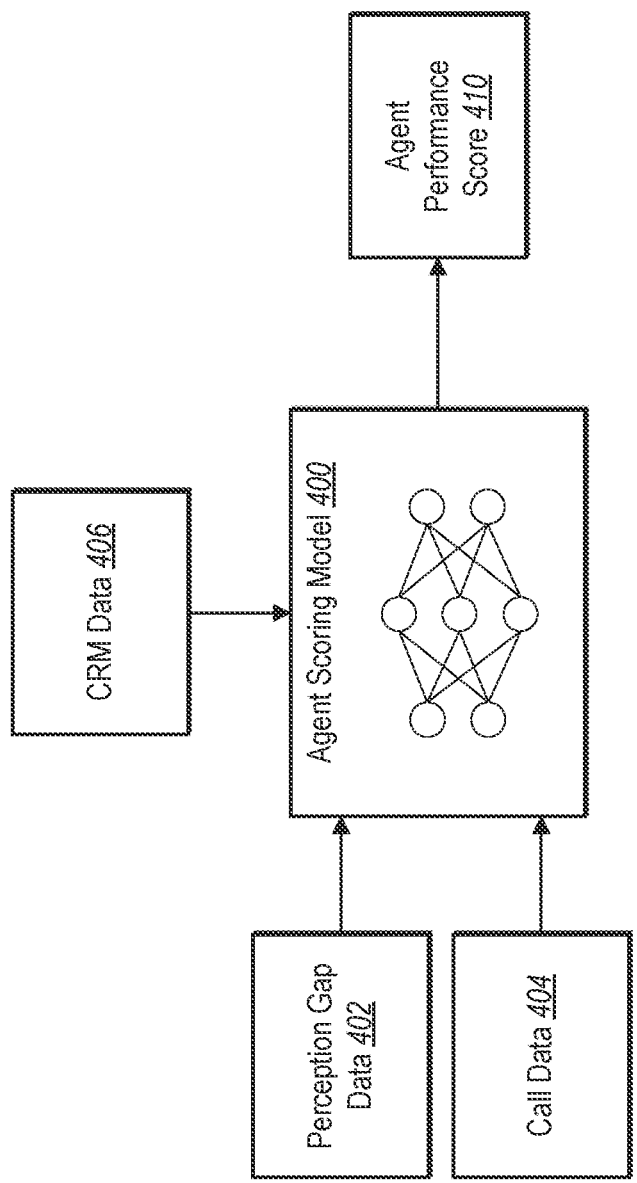
FIG. 4 illustrates a schematic diagram of the agent evaluation system utilizing an agent scoring model in accordance with one or more embodiments.

The agent evaluation system 104 can utilize an agent scoring model 400 to generate an agent performance score 410. For instance, FIG. 4 illustrates the agent evaluation system 104 generating an agent performance score 410 in accordance with one or more embodiments. Specifically, FIG. 4 illustrates the agent evaluation system 104 giving inputs to the agent scoring model 400 of perception gap data 402, call data 404 from interaction events, and CRM data 406 pertaining to one or more agents.

In some embodiments, the agent evaluation system 104 utilizes perception gap data 402 as input to the agent scoring model 400. For instance, the agent evaluation system 104 considers customer satisfaction ratings, agent ratings of perceived customer satisfaction, and metrics reflecting existences of perception gaps for multiple interaction events. For example, the agent evaluation system 104 evaluates trends of perception gaps over a period of time, average perception gap metrics, and statistical distributions of perception gap metrics (e.g., whether the perception gap metrics have a large standard deviation or a small standard deviation).

In some implementations, the agent evaluation system 104 utilizes call data 404 from multiple interaction events as input to the agent scoring model 400. For example, the agent evaluation system 104 considers a total number of interaction events handled by the agent, average case handling times, first-call resolution rates, and average number of calls to resolution. Additionally, or alternatively, the agent evaluation system 104 evaluates conversation transcriptions and/or topic keywords from post-interaction surveys to determine whether the agent is responsive to customer requests.

In some embodiments, the agent evaluation system 104 utilizes CRM data 406 pertaining to one or more agents as input to the agent scoring model 400. For example, the agent evaluation system 104 considers perception gap data and call data associated with other agents and stored as CRM data to inform the agent scoring model 400 with data from previous interaction events.

In some implementations, the agent evaluation system 104 generates an agent performance score by combining a measure of customer satisfaction with a measure of agent performance. For example, the agent evaluation system 104 determines an average handling time for all interaction events over a period of time (e.g., the previous quarter, the previous year, etc.). The agent evaluation system 104 assigns a point value for the average handling time based on a predefined scale of point values. For instance, an average handling time between five and ten minutes may receive a point value of 5, while an average handling time between ten and fifteen minutes may receive a point value of 4, and so on. The agent evaluation system 104 then combines the point value for average handling time with the agent's average customer satisfaction rating. To illustrate, the agent evaluation system 104 adds the agent's average customer satisfaction rating with the point value for average handling time to obtain the agent performance score 410.

In some embodiments, the agent evaluation system 104 utilizes other operational metrics in the call data 404 and/or the CRM data 406 to generate the agent performance score. The agent evaluation system 104 can combine these other operational metrics in similar ways as with the average customer satisfaction rating and the point value for average handling time to compute an agent performance score. Additionally, the agent evaluation system 104 can utilize perception gap data 402 to generate the agent performance score. For example, if an agent has a high magnitude of perception gap (e.g., large negative value), the agent evaluation system 104 subtracts a weighted value of that magnitude from a baseline calculation of the agent performance score.

The agent evaluation system 104 can utilize a variety of computer-implemented algorithms for the agent scoring model 400. For example, in some implementations, the agent evaluation system 104 utilizes a machine learning model, such as a trained neural network or a decision tree machine learning model. For instance, the agent evaluation system 104 can train a machine learning model to generate an agent performance score for the agent based on one or more of the perception gap data 402, the call data 404 from the agent's interaction events, and the CRM data 406 pertaining to one or more agents.

To illustrate, the agent evaluation system 104 can encode these input features (e.g., utilizing one hot encoding or an embedding network). The agent evaluation system 104 can utilize layers having learned parameters to process the encoded features. At each layer, the neural network can generate intermediate latent feature vectors representing weighted features according to the learned parameters of the network. Utilizing a variety of activation, pooling, convolution layers, normalization, and/or dropout layers, the neural network can generate a prediction (e.g., an agent performance score for the agent).

During training, the agent evaluation system 104 can learn parameters of the machine learning model. For example, the agent evaluation system 104 can compare predictions (e.g., agent performance scores) generated by a neural network with ground truth predictions (e.g., ground truth agent performance scores). In some implementations, the agent evaluation system 104 utilizes a loss function to determine a measure of loss between the prediction and the ground truth. The agent evaluation system 104 can then modify parameters of the neural network utilizing the measure of loss. For example, the agent evaluation system 104 can utilize gradient descent and backpropagation to modify parameters of the neural network to reduce the measure of loss. The agent evaluation system 104 can iteratively modify parameters utilizing training predictions and ground truths to train the neural network.

In some implementations, the agent evaluation system 104 utilizes the machine learning model to assess whether following a suggested action will improve the agent performance score by a predetermined threshold measure. Following predictive learning, the agent evaluation system 104 can reduce the measure of loss over iterations of the agent performance score analysis.

In addition to machine learning models, the agent evaluation system 104 can also utilize other models to determine an agent performance score. For example, the agent evaluation system 104 can utilize heuristic models informed by historical features. To illustrate, in some implementations, the agent evaluation system 104 utilizes heuristic models that consider a variety of different features informed by historical data to generate the agent performance score. For instance, the agent evaluation system 104 can measure CRM data 406 for one or more agents and historical agent performance scores for the one or more agents. The agent evaluation system 104 can then utilize a historical agent performance score as a predicted agent performance score in circumstances that align with the measured features. Thus, based on historical data, the agent evaluation system 104 can develop a heuristic model that generates predicted agent performance scores based on contextual features.

The agent evaluation system 104 can provide, for display via the graphical user interface, a metric representing the existence of the perception gap. For example, FIG. 5 illustrates the agent evaluation system 104 providing for display mirrored feedback interactions and metrics representing existences of perception gaps in accordance with one or more embodiments. Specifically, FIG. 5 illustrates the agent evaluation system 104 listing interaction data for several interaction events. In row 502, for example, the agent evaluation system 104 lists interaction data for an interaction event with a metric representing a perception gap of −3. Upon selection by the agent or manager of the metric in row 502, the agent evaluation system 104 can provide additional detail in a pop-up bubble 530, including a self-rating by the agent (as part of the agent feedback data) of 5 and a customer rating by the user (as part of the user feedback data) of 2. In this example, the agent evaluation system 104 subtracts the self-rating from the customer rating to obtain the metric representing the existence of a perception gap.

In some embodiments, the agent evaluation system 104 submits a post-interaction agent survey to the agent, and a post-interaction user survey to the customer. For example, the agent evaluation system 104 submits an agent survey and a user survey that both include a mutual, mirrored question soliciting a rating for the interaction event. For example, the user survey asks the customer for a customer satisfaction rating (e.g., a customer satisfaction score) and the agent survey asks, in the agent's perception, how satisfied was the customer that was serviced during the interaction event. In this way, the agent evaluation system 104 can seek mirrored feedback that elicits potential discrepancies between the agent's perception of the interaction event and the user's perception of the interaction event.

As further illustrated in FIG. 5, the agent evaluation system 104 can provide additional interaction data for interaction events. For instance, in row 504, the agent evaluation system 104 reflects a metric representing a perception gap of −2. Similarly, the agent evaluation system 104 can provide perception gap data for additional interaction events, as reflected in the graphical user interface of FIG. 5. In this way, the agent evaluation system 104 can consolidate perception gap data for an agent across multiple interaction events, thereby simplifying the steps needed for the agent to view perception gap data for interactions, and rendering the agent evaluation system 104 more efficient at conveying such data over conventional systems.

The agent evaluation system 104 can provide additional information in the graphical user interface of FIG. 5. In column 552, the agent evaluation system 104 provides customer satisfaction metrics (CSAT) for the various interaction events. For example, the interaction data for the interaction event of row 502 includes a CSAT metric of 2. This corresponds with the customer rating of 2 displayed in the pop-up bubble 530. As illustrated, additional rows of interaction data reflect additional CSAT metrics.

Further, the agent evaluation system 104 provides additional interaction data in columns 554-558. Specifically, as discussed above, in column 554, the agent evaluation system 104 displays metrics reflecting perception gaps associated with the individual interaction events. Additionally, in column 556, the agent evaluation system 104 provides topic keywords from the various interaction events. For example, in row 510 and column 556 of FIG. 5, the agent evaluation system 104 lists topic keywords including "courteous" and "helpful," reflecting feedback for the agent from the interaction event.

In some embodiments, the agent evaluation system 104 receives the topic keywords from the customer as part of the user feedback data. For example, the user selects topic keywords from a list in a user survey or inputs topic keywords as an answer to an open-ended prompt for topics to which the interaction event relates. In some implementations, the agent selects or otherwise inputs topic keywords (e.g., in response to an agent survey).

In some embodiments, the agent evaluation system 104 transcribes the topic keywords from words spoken during the conversation of the interaction event. For example, the agent evaluation system 104 utilizes a voice recording of the interaction event to transcribe the speech of the agent and the user. The agent evaluation system 104 then performs conversational analytics of the transcription to determine relevant topic keywords. Alternatively, for cases in which the interaction event plays out by chat or text message, the agent evaluation system 104 can perform textual analytics of the dialogue between the user and the agent. The agent evaluation system 104 can utilize a machine learning model or an optimization model, such as such as the agent action model 210, to determine topic keywords from the conversation or dialogue of the interaction event. Likewise, the agent evaluation system 104 can utilize the topic keywords as inputs to the agent action model 210 to determine suggested actions and/or a coaching plan for the agent (e.g., by supplementing the call data 302 with the topic keywords).

As illustrated in column 558 of the graphical user interface of FIG. 5, the agent evaluation system 104 can provide the length of time of each of the interaction events (e.g., handle time). The agent evaluation system 104 can utilize handle time data to generate suggested actions and/or agent performance scores for the agent.

In some embodiments, the agent evaluation system 104 provides selection menus, such as illustrated in column 560 of FIG. 5. The selection menus can activate links or pop-up windows that include suggested or potential actions for the agent. For example, and as described in further detail below in connection with FIG. 7, the selection menus of column 560 can prompt an agent to begin a suggested action or coaching plan.

Figure 6:
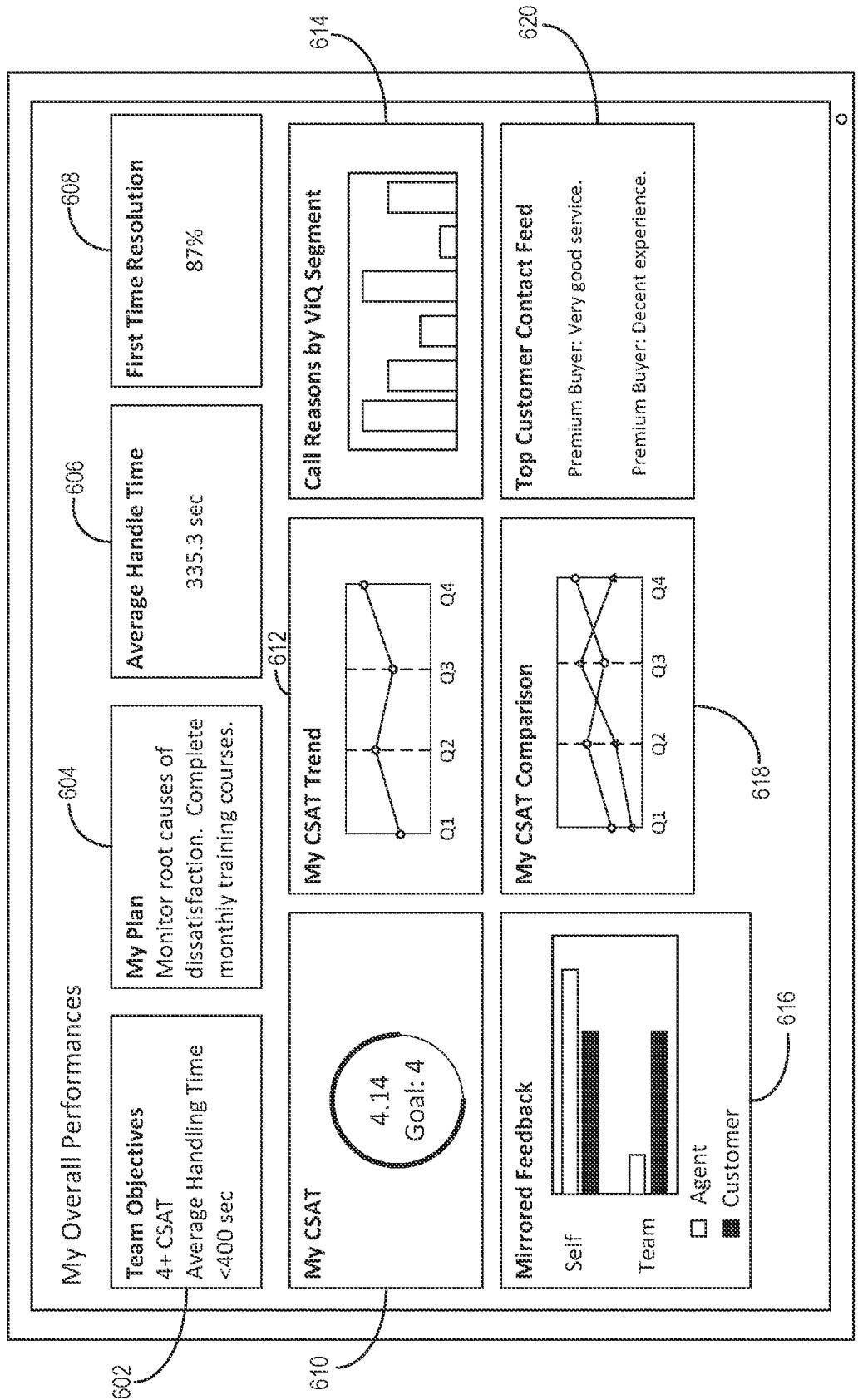
FIG. 6 illustrates a computing device presenting a graphical user interface for displaying agent performance data for an agent in accordance with one or more embodiments.

The agent evaluation system 104 can provide, for display via the graphical user interface, information reflecting an agent's overall performance. For example, FIG. 6 illustrates the agent evaluation system 104 providing widgets containing data representing an agent's overall performance and/or agent objectives, in accordance with one or more embodiments. Specifically, FIG. 6 illustrates the agent evaluation system 104 providing widgets 602-620. In some embodiments, the agent evaluation system 104 provides fewer than the illustrated widgets 602-620 for display. In some embodiments, the agent evaluation system 104 provides a subset of the widgets 602-620 along with additional widgets reflecting agent-user interaction data.

In widget 602, the agent evaluation system 104 can provide team objectives for customer satisfaction and for average handling time of an interaction event. In widget 604, the agent evaluation system 104 can provide summaries of one or more agent action plans and/or coaching plans. In widget 606, the agent evaluation system 104 indicates the agent's average handling time over multiple interaction events. In widget 608, the agent evaluation system 104 provides a percent of customer help tickets that were resolved by the agent on a first-time interaction event. In widget 610, the agent evaluation system 104 provides the agent's average customer satisfaction metric, as well as the team objective for customer satisfaction. In widget 612, the agent evaluation system 104 provides a trend of the agent's average customer satisfaction metric over time. In widget 614, the agent evaluation system 104 provides a histogram of multiple interaction events grouped by reasons for the interaction. In widget 616, the agent evaluation system 104 provides for display histograms of averages of the agent's self-ratings, customer user ratings, and team-wide agent ratings and customer user ratings. In widget 618, the agent evaluation system 104 provides a time-wise comparison of the agent's customer satisfaction metrics with team average customer satisfaction metrics. In widget 620, the agent evaluation system 104 provides a feed of user feedback data including reasons for an interaction and/or customer-supplied comments.

By providing some or all of the widgets illustrated in FIG. 6 for display via a single graphical user interface, the agent evaluation system 104 improves upon conventional customer relationship management systems by making both individual agent interaction event data and team-wide interaction event data accessible readily accessible to an agent and/or a manager. For example, the agent evaluation system 104 avoids the limitations of conventional systems which required navigation through several steps (e.g., 3, 4, 5, or more steps) to retrieve meaningful information from the system. Thus, the agent evaluation system 104 is more efficient at supplying interaction data in a meaningful way.

Figure 7:
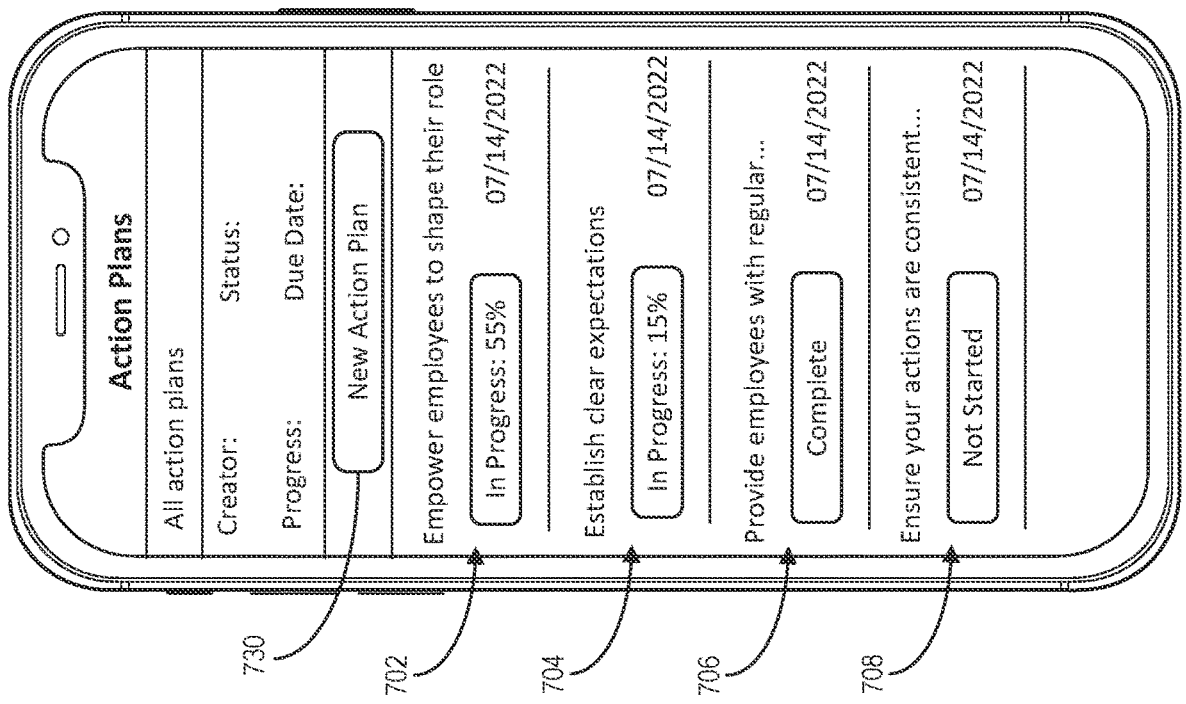
FIG. 7 illustrates a computing device presenting a graphical user interface for providing one or more actions for display in accordance with one or more embodiments.

As mentioned, the agent evaluation system 104 can provide, for display via a graphical user interface of an agent device, selected and/or suggested actions. For example, FIG. 7 illustrates the agent evaluation system 104 providing an action plan (e.g., comprising several suggested actions) for the agent, in accordance with one or more embodiments. Specifically, FIG. 7 illustrates a graphical user interface of an agent's mobile device, via which the agent evaluation system 104 provides one or more suggested actions in progress, completed actions, and/or actions not yet started.

For instance, in FIG. 7, the agent evaluation system 104 provides an in-progress action 702 that is 55% complete, and an in-progress action 704 that is 15% complete. Furthermore, the agent evaluation system 104 provides a completed action 706 and an un-started action 708. The agent evaluation system 104 can populate the suggested actions (whether not started, in progress, or complete) into the action plan. For example, as discussed in connection with FIG. 5, the agent evaluation system 104 provides an option to an agent to select and begin an action in response to feedback for a particular interaction event. Similarly, the agent evaluation system 104 can provide an agent with an option to develop a self-evaluation (e.g., a self-coaching plan) and add the self-evaluation to the agent's list of actions. The agent evaluation system 104 incorporates the self-evaluation into the agent's coaching plan.

In some embodiments, the agent evaluation system 104 provides a selectable element 730 for creating a new action plan. The selectable element 730 can be a button, a link, a toggle switch, or any other user-selectable feature for entering a new action or action plan.

Figure 8:
FIG. 8 illustrates a computing device presenting a graphical user interface for receiving agent feedback in accordance with one or more embodiments.

As mentioned, the agent evaluation system 104 can provide, for display via the graphical user interface of the agent device, an option to submit feedback to the agent evaluation system 104. For example, FIG. 8 illustrates the agent evaluation system 104 providing a case feedback selection pop-up window 802 to the agent, in accordance with one or more embodiments. Specifically, FIG. 8 illustrates the agent evaluation system 104 providing, through the case feedback selection pop-up window 802, an option for the agent to identify an interaction event that should be removed from consideration in determining the agent performance score for the agent. Upon submission by the agent that an interaction event should be removed from consideration in determining the agent performance score, the agent evaluation system 104 evaluates the submission and determines whether to remove the interaction event from consideration. For example, the agent evaluation system 104 utilizes the agent scoring model 400 to evaluate whether the agent has progressed along a particular action plan to merit updating the agent performance score without the particular interaction included in the score determination process.

In some cases, an agent views a certain interaction event as being outside the agent's control. For instance, a customer may be irate for reasons that are no fault of the agent. For example, a customer may be disgruntled with past events that did not involve the agent, and may initiate an interaction event with the agent while continuing to harbor such dissatisfaction. The agent may meet or exceed the level of care expected by the manager or department, yet the customer may mark a low customer satisfaction rating for the interaction event. Thus, the interaction event may have a large perception gap, to the possible detriment (undeservedly) of the agent. To address situations such as this, the agent evaluation system 104 can accommodate agent requests to exclude the interaction event from the determination of the agent performance score. In some implementations, upon user selection to exclude an interaction event, the agent evaluation system 104 provides the agent with a survey query for details of the interaction event. For example, the agent evaluation system 104 gives the agent an open-ended question for why the interaction event should be omitted from agent performance score determination. In some embodiments, the agent evaluation system 104 provides a survey with predetermined possible answer choices that include a scenario of a disgruntled customer.

In the event of an agent submitting a request to exclude an interaction event from the agent performance score determination, the agent evaluation system 104 can evaluate the request utilizing the agent scoring model 400. For instance, the agent evaluation system 104 utilizes the agent scoring model 400 to assess whether the request comports with quality assurance controls. In some embodiments, the agent evaluation system 104 considers whether the customer experience system 102 or the customer relationship management system 114 has stored historical data associated with the particular customer connected with the interaction event. For instance, if the particular customer has submitted previous negative customer satisfaction ratings related to the same issue as the issue addressed by the agent, the agent evaluation system 104 may consider this historical data in a favorable light towards the agent.

As mentioned, the agent evaluation system 104 can provide, for display via a graphical user interface of the manager device, an aggregation of agent performance data. For example, FIG. 9 illustrates the agent evaluation system 104 providing a manager command center, in accordance with one or more embodiments. Specifically, FIG. 9 illustrates the agent evaluation system 104 providing the manager command center including an agent focus panel 902 and a listing of performance metrics 904 for multiple agents.

In some embodiments, the agent evaluation system 104 provides the agent focus panel 902, including coaching cards (e.g., widgets) of agent performance data for one or more agents. The agent evaluation system 104 can sort and provide a selection of coaching cards based on coaching priorities. In the coaching cards of the agent focus panel 902, the agent evaluation system 104 can provide for display current agent performance scores, as well as agent performance score trends over a period of time. The agent evaluation system 104 can select performance data of certain agents based on current coaching type status of the agents. For example, the agent evaluation system 104 may prioritize agents having a coaching type of "recognize" or "improve" into the agent focus panel 902.

By providing coaching priorities, such as the coaching cards of a select few agents in the agent focus panel 902, the agent evaluation system 104 improves efficiency of the manager command center over conventional systems. For example, the agent evaluation system 104 simplifies a manager task of determining, from the manager command center, a relatively small group of agents for prioritized focus. In this way, the agent evaluation system 104 simplifies the user interface for the manager command center to avoid a manager manipulating data for numerous agents through several screens, clicks, and/or computations.

As also illustrated in FIG. 9, in some embodiments, the agent evaluation system 104 provides the listing of performance metrics 904 for multiple agents. For instance, the agent evaluation system 104 provides a list of multiple agents with agent performance scores, coaching types, average perception gaps, top topics from interaction events, and progress of current action plans.

The agent evaluation system 104 can assign a coaching type to an agent based on the agent's agent performance score. For example, the agent evaluation system 104 may include predetermined ranges of agent performance scores that correlate with particular coaching types. In some embodiments, the agent evaluation system 104 considers recent trends of the agent performance score as a factor for coaching type assignment. For example, if an agent's agent performance score has increased over one or more recent quarters, the agent evaluation system 104 can assign the coaching type "recognize," as in the example of Marco S. from FIG. 9.

In some implementations, the agent evaluation system 104 assigns a coaching type based on the direction (e.g., sign) of the average of the perception gaps associated with an agent. For example, as reflected in FIG. 9 in the example of Han S., an average perception gap with a large negative value is assigned the coaching type "improve." In this case, the agent may consistently leave customers frustrated or dissatisfied with experiences from the interaction events with this agent. By contrast, in the example of Will B., an average perception gap with a large positive value may be assigned the coaching type "reinforce." In this case, the agent may not realize that the interaction events generally leave customers satisfied.

In some embodiments, the agent evaluation system 104 considers top keyword topics associated with the calls to assign a coaching type. For the example of Tamara D., the top keyword topics are "quick" and "cheerful," which are associated with customer satisfaction. The agent evaluation system 104 can consider these indicators of customer satisfaction, despite a negative average perception gap, to assign the coaching type "awareness."

The agent evaluation system 104, in one or more embodiments, utilizes the agent scoring model 400 and/or the agent action model 210 to generate the coaching types. For example, as described above in connection with these models, the agent evaluation system 104 utilizes a machine learning model to evaluate agent performance data, compare the agent performance data with historical agent performance data and/or historical CRM data, and minimize a loss function based on a ground truth coaching type for similar agent performance data. In some implementations, the agent evaluation system 104 bases the coaching type determination on relative performance of an agent compared with aggregate agent performance data for multiple agents.

In some embodiments, the agent evaluation system 104 provides a selectable element 930 to solicit frontline feedback from one or more agents. For example, the agent evaluation system 104 identifies Marco S. as a high-performing agent and provides (e.g., for display in the manager command center), a selectable element 930 to request feedback from this agent. As additional examples in FIG. 9, the agent evaluation system 104 provides a selectable element 930 to request feedback from additional agents. In some embodiments, the agent evaluation system 104 determines agents from whom to solicit feedback based on the agent performance score exceeding a predetermined threshold value.

Figure 10:
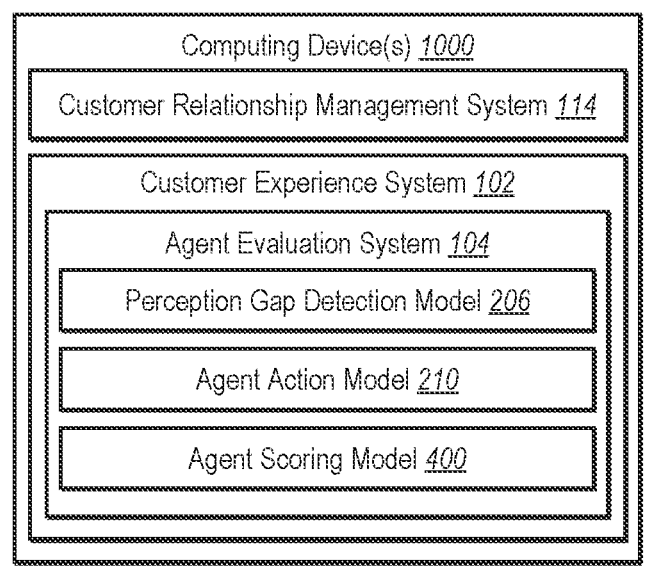
FIG. 10 illustrates a block diagram of the environment of FIG. 1 in accordance with one or more embodiments.

FIG. 10 illustrates an example embodiment of a system environment that includes the customer experience system 102 and the agent evaluation system 104 of FIG. 1, as well as the customer relationship management system 114. Specifically, the customer relationship management system 114 and the customer experience system 102 operate on computing device(s) 1000. The agent evaluation system 104 includes the perception gap detection model 206, the agent action model 210, and the agent scoring model 400. Although the agent evaluation system 104 is depicted as having various components, the agent evaluation system 104 can have any number of additional or alternative components. For example, one or more components of the agent evaluation system 104 can be combined into fewer components or divided into more components. Additionally, the agent evaluation system 104 may be on any number of computing devices or on a single computing device. In some embodiments, the customer experience system 102 includes the agent evaluation system 104. Alternatively, in some embodiments, the agent evaluation system 104 is a stand-alone system separate from customer experience system 102. In some embodiments, the customer relationship management system 114 and the customer experience system 102 operate on separate computing devices. Alternatively, in some embodiments, the customer relationship management system 114 and the customer experience system 102 operate on the same computing device or devices.

In one or more embodiments, each of the components and subcomponents of the agent evaluation system 104 can be in communication with one another using any suitable communication technologies. It will be recognized that, although the subcomponents of the agent evaluation system 104 are shown to be separate in FIG. 10, any of the subcomponents can be combined into fewer components, such as into a single component, or divided into more components as can serve a particular implementation. Furthermore, although the components of FIG. 10 are described in connection with the agent evaluation system 104, at least some of the components for performing operations in conjunction with the agent evaluation system 104 described herein can be implemented on other devices and/or with other systems.

Each of the components of the agent evaluation system 104 can include software, hardware, or both. For example, the components of the agent evaluation system 104 can include one or more instructions stored on a computer-readable storage medium and executable by processors of one or more computing devices, such as a client device or server device. When executed by the one or more processors, the computer-executable instructions of the agent evaluation system 104 can cause the computing device(s) 1000 to perform the methods described herein. Alternatively, the components of the agent evaluation system 104 can include hardware, such as a special purpose processing device to perform a certain function or group of functions. Moreover, the components of the agent evaluation system 104 can include a combination of computer-executable instructions and hardware.

Furthermore, the components of the agent evaluation system 104 performing the functions described herein can, for example, be implemented as one or more operating systems, as one or more stand-alone applications, as one or more modules of an application, as one or more plug-ins, as one or more library functions or functions that can be called by other applications, and/or as a cloud-computing model. Thus, the various components of the agent evaluation system 104 can be implemented as part of a stand-alone application, such as a desktop application or a mobile application. Furthermore, the components of the agent evaluation system 104 can be implemented as one or more web-based applications hosted on a remote server. The components of the agent evaluation system 104 can also be implemented in a suite of mobile device applications or "apps."

Figure 11:
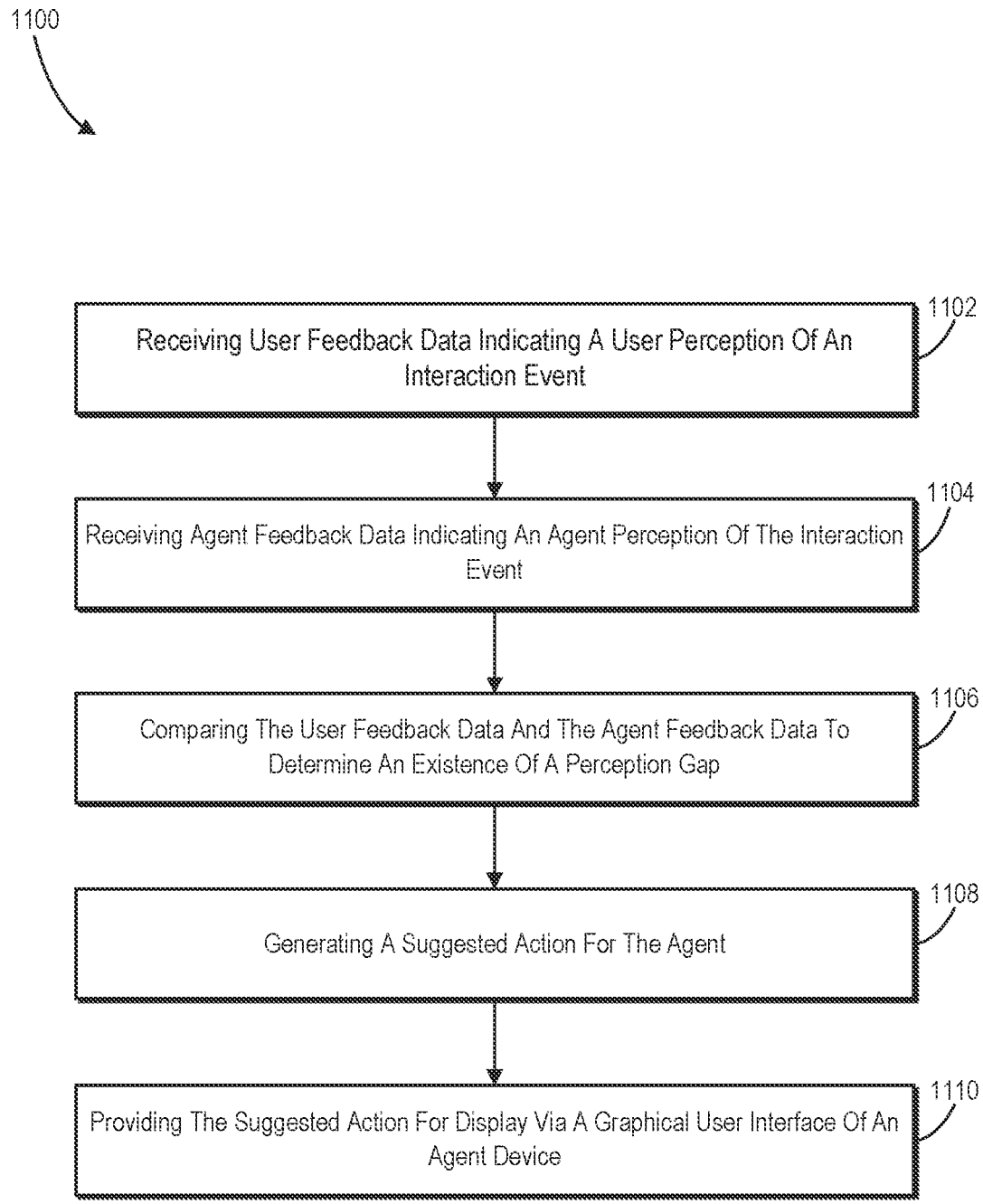
FIG. 11 illustrates a flowchart of a series of acts for generating and providing a suggested action in accordance with one or more embodiments.

FIGS. 1-10, the corresponding text, and the examples provide a number of different methods, systems, devices, and non-transitory computer-readable media of the agent evaluation system 104. In addition to the foregoing, one or more embodiments can also be described in terms of flowcharts comprising acts for accomplishing a particular result, as shown in FIG. 11. FIG. 11 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a flowchart of a series of acts 1100 for generating and displaying a suggested action in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1102 for receiving user feedback data indicating a user perception of an interaction event. As also shown in FIG. 11, the series of acts 1100 includes an act 1104 for receiving agent feedback data indicating an agent perception of the interaction event. In particular, the act 1104 can include receiving agent feedback data associated with an agent, the agent feedback data indicating an agent perception of the interaction event. As further shown in FIG. 11, the series of acts 1100 includes an act 1106 for comparing the user feedback data and the agent feedback data to determine an existence of a perception gap. In particular, the act 1106 can include comparing the user feedback data and the agent feedback data to determine an existence of a perception gap between the user perception of the interaction event and the agent perception of the interaction event. As additionally shown in FIG. 11, the series of acts 1100 includes an act 1108 for generating a suggested action for the agent. In particular, the act 1108 can include generating, based on determining the existence of the perception gap, a suggested action for the agent. As also shown in FIG. 11, the series of acts 1100 includes an act 1110 for providing the suggested action for display via a graphical user interface of an agent device. In particular, the act 1110 can include providing the suggested action for display via a graphical user interface of an agent device associated with the agent.

Moreover, in some implementations, the series of acts 1100 further includes generating topic keywords from a spoken conversation during the interaction event; displaying the topic keywords in a list of topics relating to the interaction event; generating the suggested action for the agent based on at least one of historical data pertaining to the agent or aggregated historical data pertaining to a group of agents; and utilizing a machine learning model to generate the suggested action for the agent.

In some embodiments, the series of acts 1100 further includes generating an agent performance score reflecting an overall performance of the agent for multiple interaction events by analyzing the user feedback data and the agent feedback data; and utilizing a machine learning model to generate the agent performance score by analyzing call data from the interaction event, perception gap data from the multiple interaction events, and CRM data from the multiple interaction events. The series of acts 1100 can further include receiving an indication from the agent that a previous interaction event should be removed from consideration in generating the agent performance score; verifying that the previous interaction event should be removed from consideration in generating the agent performance score; removing the previous interaction event from consideration in generating the agent performance score; and updating the agent performance score.

Further, in some implementations, the series of acts 1100 further includes providing, via the graphical user interface, a metric representing the existence of the perception gap. The series of acts 1100 can further include generating an agent survey comprising a prompt for soliciting feedback from the agent; and receiving the agent feedback data in response to the agent survey. The series of acts 1100 can further include utilizing live call data to generate the suggested action for the agent.

In some embodiments, the series of acts 1100 further includes measuring agent effectiveness for the agent by analyzing CRM data from multiple interaction events; and tracking the agent effectiveness throughout a coaching plan for the agent by monitoring additional CRM data from additional multiple interaction events. The series of acts 1100 can further include receiving a self-evaluation from the agent and incorporating the self-evaluation into the coaching plan. The series of acts 1100 can further include generating the coaching plan by providing topic areas for improving agent performance.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 12:
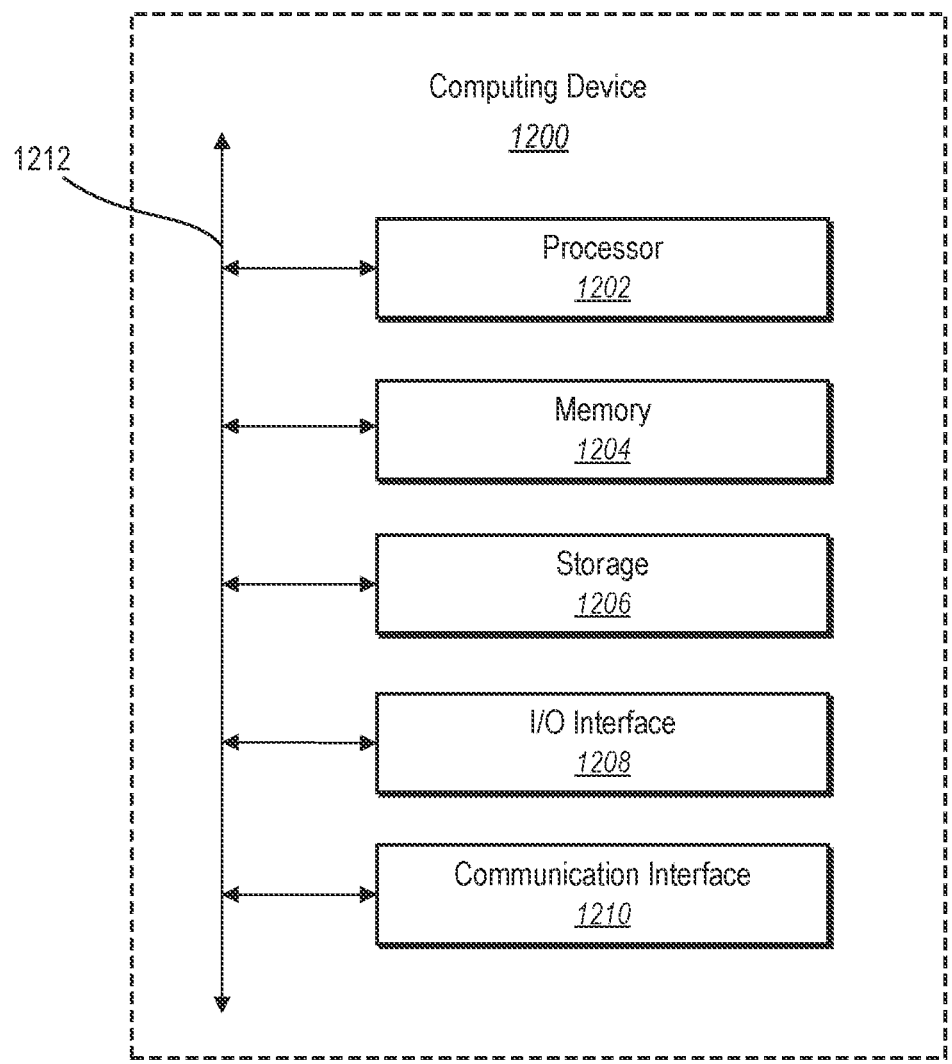
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., the server device(s) 106, the server device(s) 116, the agent client device 108, or the user client device 110). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes the memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes the storage device 1206 for storing data or instructions. As an example, and not by way of limitation, the storage device 1206 can include a non-transitory storage medium described above. The storage device 1206 may include a hard disk drive ("HDD"), flash memory, a Universal Serial Bus ("USB") drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include the bus 1212. The bus 1212 can include hardware, software, or both that connects components of computing device 1200 to each other.

Additionally, or alternatively, the communication interface 1210 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1210 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1210 may facilitate communications via various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1212 may include hardware, software, or both that couples components of the computing device 1200 to each other. As an example and not by way of limitation, the communication infrastructure 1212 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 13:
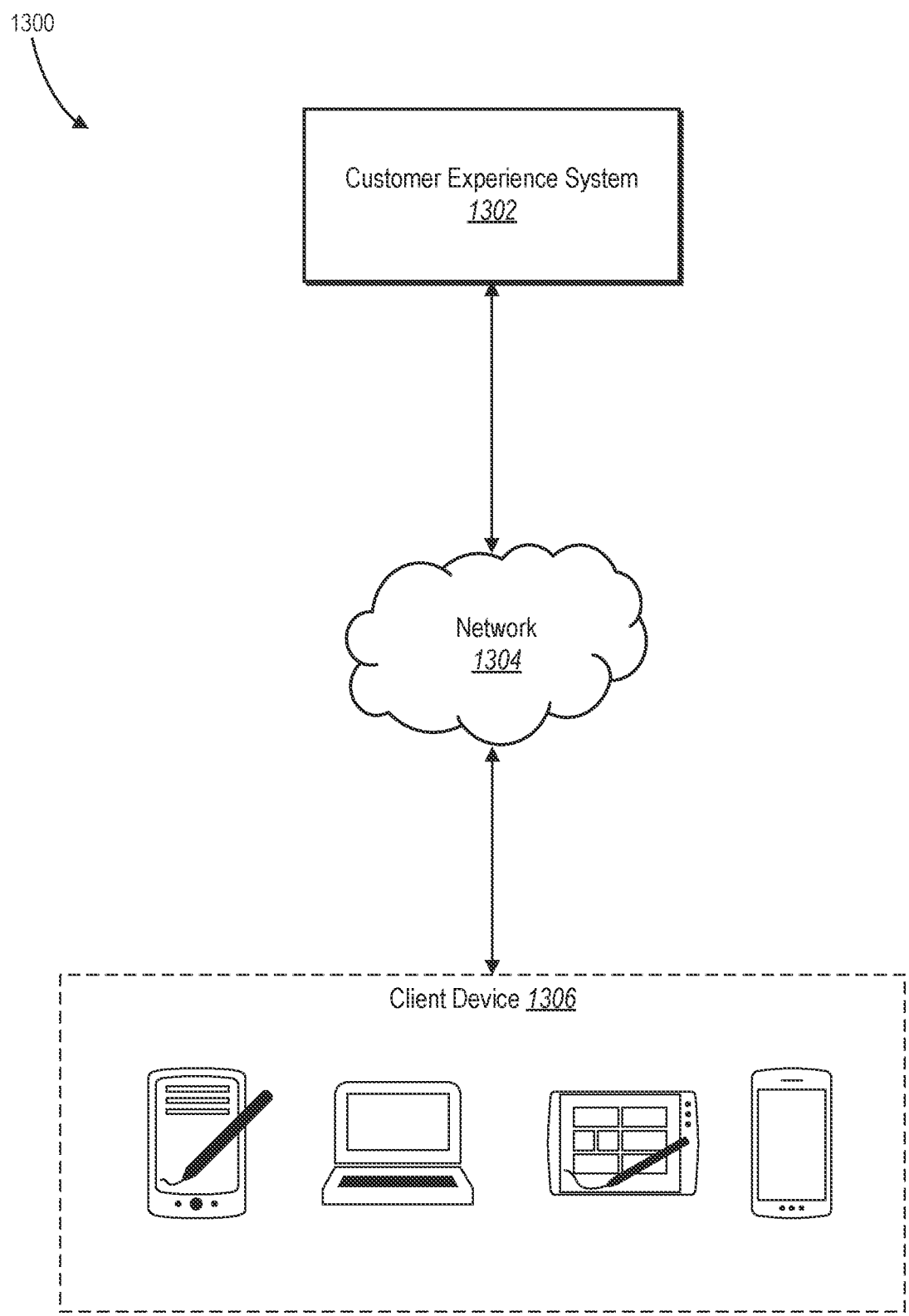
FIG. 13 illustrates a network environment of a customer experience system in accordance with one or more embodiments.

FIG. 13 illustrates an example network environment 1300 of a customer experience system 1302 (e.g., the customer experience system 102, including the agent evaluation system 104). The network environment 1300 includes a client device 1306 and a customer experience system 1302, connected to each other by a network 1304. Although FIG. 13 illustrates a particular arrangement of the client device 1306, the customer experience system 1302, and the network 1304, this disclosure contemplates any suitable arrangement of the client device 1306, the customer experience system 1302, and the network 1304. As an example, and not by way of limitation, two or more of the client device 1306 and the customer experience system 1302 communicate directly, bypassing the network 1304. As another example, two or more of the client device 1306 and the customer experience system 1302 may be physically or logically co-located with each other in whole or in part. Moreover, although FIG. 13 illustrates a particular number of the client device 1306, the customer experience system 1302, and the network 1304, this disclosure contemplates any suitable number of client devices 1306, customer experience systems 1302, and networks 1304. As an example, and not by way of limitation, the network environment 1300 may 1300 may include multiple client devices 1306, multiple customer experience systems 1302, and multiple networks 1304.

This disclosure contemplates any suitable network 1304. As an example, and not by way of limitation, one or more portions of the network 1304 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. The network 1304 may include one or more networks 1304.

Links may connect the client device 1306 and the customer experience system 1302 to the network 1304 or to each other. This disclosure contemplates any suitable links. In particular embodiments, one or more links include one or more wireline (such as, for example, Digital Subscriber Line ("DSL") or Data Over Cable Service Interface Specification ("DOCSIS")), wireless (such as, for example, Wi-Fi or Worldwide Interoperability for Microwave Access ("WiMAX")), or optical (such as, for example, Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1300. One or more first links may differ in one or more respects from one or more second links.

In particular embodiments, the client device 1306 may be an electronic device including hardware, software, or embedded logic components or a combination of two or more such components and capable of carrying out the appropriate functionalities implemented or supported by the client device 1306. As an example, and not by way of limitation, a client device 1306 may include any of the computing devices discussed above in relation to FIG. 12. A client device 1306 may enable a network user at the client device 1306 to access a network. A client device 1306 may enable its user to communicate with other users at other client devices 1306. A client device 1306 can be the agent client device 108. A client device 1306 can be the user client device 110. A client device 1306 can include both the agent client device 108 and the user client device 110.

In particular embodiments, the client device 1306 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1306 may enter a Uniform Resource Locator ("URL") or other address directing the web browser to a particular server (such as the server device(s) 106), and the web browser may generate a Hyper Text Transfer Protocol ("HTTP") request and communicate the HTTP request to the server. The server may accept the HTTP request and communicate to the client device 1306 one or more Hyper Text Markup Language ("HTML") files responsive to the HTTP request. The client device 1306 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

The customer experience system 1302 may be accessed by the other components of the network environment 1300 either directly or via network 1304. In particular embodiments, the customer experience system 1302 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the customer experience system 1302 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable the client device 1306 or the customer experience system 1302 to manage, retrieve, modify, add, or delete, the information stored in data storage.

In particular embodiments, the customer experience system 1302 may be capable of linking a variety of entities. As an example, and not by way of limitation, the customer experience system 1302 may enable multiple users and/or agents to interact with each other or other entities, or to allow users and/or agents to interact with these entities through an application programming interface ("API") or other communication channels.

In particular embodiments, the customer experience system 1302 may include a variety of servers, sub-systems, programs, modules, logs, and data stores. In particular embodiments, the customer experience system 1302 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The customer experience system 1302 may also include suitable components such as network interfaces, security mechanisms, load balancers, failover servers, management-and-network-operations consoles, other suitable components, or any suitable combination thereof.

In particular embodiments, the customer experience system 1302 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., customers, etc.).

The web server may include a mail server or other messaging functionality for receiving and routing messages between the customer experience system 1302 and one or more client devices 1306. An action logger may be used to receive communications from a web server about a user's actions on or off the customer experience system 1302. In conjunction with the action log, a third-party-content-object log may be maintained of user exposures to third-party-content objects. A notification controller may provide information regarding content objects to the client device 1306. Information may be pushed to the client device 1306 as notifications, or information may be pulled from the client device 1306 responsive to a request received from the client device 1306. Authorization servers may be used to enforce one or more privacy settings of the users of the customer experience system 1302. A privacy setting of a user determines how particular information associated with a user can be shared. The authorization server may allow users to opt in to or opt out of having their actions logged by the customer experience system 1302 or shared with other systems, such as, for example, by setting appropriate privacy settings. Third-party-content-object stores may be used to store content objects received from third parties. Location stores may be used for storing location information received from the client devices 1306 associated with users.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
receiving user feedback data indicating a user perception of an interaction event;
receiving agent feedback data associated with an agent, the agent feedback data indicating an agent perception of the interaction event;
comparing the user feedback data and the agent feedback data to determine an existence of a perception gap between the user perception of the interaction event and the agent perception of the interaction event;
generating, based on determining the existence of the perception gap, a suggested action for the agent by:
obtaining historical data comprising historical suggested actions and changes to historical agent metrics resulting from the historical suggested actions; and
utilizing a heuristic model to determine a proposed course of action for the agent based on the historical data; and
providing the suggested action for display via a graphical user interface of an agent device associated with the agent.

2. The computer-implemented method of claim 1, further comprising:
generating topic keywords from a spoken conversation during the interaction event; and
providing, for display via the graphical user interface of the agent device, the topic keywords in relation to the interaction event.

3. The computer-implemented method of claim 1, wherein obtaining the historical data comprises obtaining aggregated historical data pertaining to a group of agents.

4. The computer-implemented method of claim 1, further comprising utilizing a machine learning model to generate the suggested action for the agent.

5. The computer-implemented method of claim 1, further comprising generating an agent performance score reflecting an overall performance of the agent for multiple interaction events by analyzing the user feedback data and the agent feedback data.

6. The computer-implemented method of claim 5, further comprising utilizing a machine learning model to generate the agent performance score by analyzing call data from the interaction event, perception gap data from the multiple interaction events, and CRM data from the multiple interaction events.

7. The computer-implemented method of claim 5, further comprising:
receiving an indication from the agent that a previous interaction event should be removed from consideration in generating the agent performance score;
verifying that the previous interaction event should be removed from consideration in generating the agent performance score;
removing the previous interaction event from consideration in generating the agent performance score; and
updating the agent performance score.

8. A non-transitory computer-readable storage medium storing instructions that, when executed by at least one processor, cause a computing device to:
receive user feedback data indicating a user perception of an interaction event;

receive agent feedback data associated with an agent, the agent feedback data indicating an agent perception of the interaction event;

compare the user feedback data and the agent feedback data to determine an existence of a perception gap between the user perception of the interaction event and the agent perception of the interaction event;

generate, based on determining the existence of the perception gap, a suggested action for the agent by:
obtaining historical data comprising historical suggested actions and changes to historical agent metrics resulting from the historical suggested actions; and
utilizing a heuristic model to determine a proposed course of action for the agent based on the historical data; and provide the suggested action for display via a graphical user interface of an agent device associated with the agent.

9. The non-transitory computer-readable storage medium of claim 8, further comprising instructions that, when executed by the at least one processor, cause the computing device to provide, via the graphical user interface, a metric representing the existence of the perception gap.

10. The non-transitory computer-readable storage medium of claim 8, further comprising instructions that, when executed by the at least one processor, cause the computing device to:
generate an agent survey comprising a prompt for soliciting feedback from the agent; and
receive the agent feedback data in response to the agent survey.

11. The non-transitory computer-readable storage medium of claim 8, further comprising instructions that, when executed by the at least one processor, cause the computing device to utilize live call data to generate the suggested action for the agent.

12. The non-transitory computer-readable storage medium of claim 8, further comprising instructions that, when executed by the at least one processor, cause the computing device to:
measure agent effectiveness for the agent by analyzing CRM data from multiple interaction events; and
track the agent effectiveness throughout a coaching plan for the agent by monitoring additional CRM data from additional multiple interaction events.

13. The non-transitory computer-readable storage medium of claim 12, further comprising instructions that, when executed by the at least one processor, cause the computing device to receive a self-evaluation data from the agent device and incorporate the self-evaluation data into the coaching plan.

14. The non-transitory computer-readable storage medium of claim 12, further comprising instructions that, when executed by the at least one processor, cause the computing device to generate the coaching plan by providing topic areas for improving agent performance.

15. A system comprising:
at least one processor; and
at least one non-transitory computer-readable storage medium storing instructions that, when executed by the at least one processor, cause the system to:
receive user feedback data indicating a user perception of an interaction event;
receive agent feedback data associated with an agent, the agent feedback data indicating an agent perception of the interaction event;
compare the user feedback data and the agent feedback data to determine an existence of a perception gap between the user perception of the interaction event and the agent perception of the interaction event;
generate, based on determining the existence of the perception gap, a suggested action for the agent by:
obtaining historical data comprising historical suggested actions and changes to historical agent metrics resulting from the historical suggested actions; and
utilizing a heuristic model to determine a proposed course of action for the agent based on the historical data; and
provide the suggested action for display via a graphical user interface of an agent device associated with the agent.

16. The system of claim 15, further comprising instructions that, when executed by the at least one processor, cause the system to provide, via the graphical user interface, a metric representing the existence of the perception gap.

17. The system of claim 15, further comprising instructions that, when executed by the at least one processor, cause the system to utilize live call data to generate the suggested action for the agent.

18. The system of claim 15, further comprising instructions that, when executed by the at least one processor, cause the system to:
generate topic keywords from a spoken conversation during the interaction event; and
display the topic keywords in a list of topics relating to the interaction event.

19. The system of claim 15, wherein obtaining the historical data comprises obtaining aggregated historical data pertaining to a group of agents.

20. The system of claim 15, further comprising instructions that, when executed by the at least one processor, cause the system to utilize a machine learning model to generate the suggested action for the agent.

* * * * *